United States Patent Office 3,000,980
Patented Sept. 19, 1961

3,000,980
PREPARATION OF ALKYL BROMIDES
Arthur A. Asadorian, Midland, and George A. Burk, Bay City, Mich., assignors to The Dow Chemical Company, Midland, Mich., a corporation of Delaware
No Drawing. Filed Apr. 7, 1958, Ser. No. 726,607
7 Claims. (Cl. 260—658)

The present invention relates to bromination of organic compounds and more particularly relates to the replacement of chlorine with bromine in chlorinated aliphatic compounds. Further, the present invention relates to the simultaneous bromination of both aromatic and aliphatic compounds and aliphatic chloro compounds.

It has been found that a saturated aliphatic halohydrocarbon containing at least one chlorine atom can be brominated with hydrogen bromide in the presence of ferric chloride. Alternatively, it can be brominated by hydrogen bromide formed in situ by the bromination of a hydrocarbon compound, which may contain halogen substituents and having a replaceable hydrogen atom, with bromine in the presence of ferric chloride. Thus, it has now been found possible to brominate aromatic, haloaromatic, paraffinic or haloparaffinic compounds with bromine and ferric chloride and simultaneously replace chlorine in a saturated halohydrocarbon with the bromine of the HBr generated in situ.

In one manner of carrying out the present invention a saturated halohydrocarbon containing at least one chlorine atom attached to an aliphatic carbon atom is contacted with hydrogen bromide in the presence of ferric chloride. The hydrogen bromide is employed in a molar amount at least equal to the chlorine atoms to be replaced. Thus, if a single chlorine atom is to be replaced at least one mole of hydrogen bromide is employed for each mole of chlorine containing reactant; if two chlorines then two, etc. The reaction proceeds smoothly when the reactants are contacted at temperatures of from 25° to 120° C. The catalyst is preferably employed in amounts of from 0.5 to 5 percent by weight based on the chlorine containing reactant.

Alternatively, the hydrogen bromide of reaction may be generated in situ. Thus, a hydrocarbon compound which may contain halogen substituents and having a replaceable hydrogen atom may be brominated with bromine in the presence of ferric chloride and in the presence of a saturated halohydrocarbon to produce the brominated hydrocarbon and hydrogen bromide in situ which will react with the saturated halohydrocarbon to replace chlorine therein, in the manner hereinbefore described. The reactions which occur may be characterized as follows:

(I)
$$\text{RCl} + \text{HBr} \xrightarrow{\text{FeCl}_3} \text{RBr} + \text{HCl}$$

(II)
$$\text{RCl} + \text{R'H} + \text{Br}_2 \xrightarrow{\text{FeCl}_3} \text{RBr} + \text{R'Br} + \text{HCl}$$

In either case the products of the reaction can be conveniently separated by fractional distillation.

Substantially any organic compound can be employed in accordance with the present invention as long as it is within the defined scope of the materials, i.e., in the first instance, wherein hydrogen bromide is the reactant the compound is a saturated halohydrocarbon which contains at least one chlorine atom attached to an aliphatic carbon atom and, in the second instance, any of the aforementioned compounds or any aromatic, aliphatic haloaromatic or haloaliphatic compound which has a replaceable hydrogen atom.

Thus, one can employ as the saturated halohydrocarbon compound, carbon tetrachloride, chloroform, dichloromethane, bromotrichloromethane, trichloroethane, propylene dichloride, ethylene dichloride, chlorobromomethane 1-chloro-propane, 2-chloro-propane, and the like. As the replaceable-hydrogen-containing hydrocarbon or halohydrocarbon compound one can employ benzene, toluene, naphthalene, chlorobenzene, o, m or p-chloro-toluene, the propanes, the butanes, the pentanes, hexanes, heptanes and their bromo or chloro derivatives, and the like. Further, the chloro compound and the organic compound may be one and the same, for example, one can employ pentachloroethane to obtain dibromotetrachloroethane.

The use of the ferric chloride catalyst is considered essential since it does not catalyze condensation and isomerization reactions in the usual manner expected of Friedel-Crafts type catalyst.

The following examples illustrate the present invention but are not to be construed as limiting.

Example 1

5 moles of benzene dissolved in 5 moles of carbon tetrachloride containing two percent by weight of ferric chloride was heated to the reflux temperature (76° C.) and 620 grams (3.87 moles) of bromine added in a portionwise manner over a six and one quarter hour period. During the addition, hydrogen chloride gas was evolved. Upon completion of the evolution of hydrogen chloride of reaction, the crude oil was washed and neutralized. It weighed 1487 grams and by distillation analyzed 35 percent bromobenzene, 5 percent paradibromobenzene, 20 percent CBrCl$_3$, 20 percent CBr$_2$Cl$_2$, the remainder CCl$_4$. Half of the bromine feed, or 100 percent of the theoretical bromine, was fixed in the aromatic and 92 percent of generated by-product HBr was converted to alkyl bromides.

Example 2

In a like manner, employing toluene in place of benzene, 2.2 percent by weight of ferric chloride and a temperature of 86° to 96° C., there was obtained ortho- and para-bromotoluene and bromotrichloromethane.

Example 3

In like manner of Example 1, employing equal volumes of 1,2-dibromopropane and CCl$_4$ containing 0.34 percent FeCl$_3$ and a temperature of from 70–105° C., there was obtained a mixture of 1,1,2- and 1,2,3-tribromopropanes mixed with CBrCl$_3$, CBr$_2$Cl$_2$, CBr$_3$Cl and CBr$_4$.

Example 4

A mixture of 1000 cc. of carbon tetrachloride (1588 grams, 10.3 moles) of 81 grams of FeCl$_3$ (5 mole percent) was treated with HBr gas by bubbling the gas into the reaction mixture over a 35 hour period. The reaction mixture was heated to from 40° to 70° C. over this period. The reactor was provided with a vent gas scrubber to recover the unreacted CCl$_4$. There was obtained as a result of these operations 643 cc. (1382 grams) of product as an oil. This is a 79.5 percent yield calculated for CBrCl$_3$. Analysis of product was:

| | Percent |
|---|---|
| CBrCl$_3$ | 43.4 |
| CBr$_2$Cl$_2$ | 30.5 |
| CBr$_3$Cl | 17.5 |
| CBr$_4$ | 5.6 |

We claim:
1. A process for preparing bromine-containing compounds which comprises contacting an organic compound selected from the group consisting of aromatic, halogenated aromatic, paraffinic and halogenated paraffinic hydrocarbons and having a replaceable carbon bound H atom in the molecule, which compound may also contain halogen atoms, with bromine and a saturated aliphatic halohydrocarbon containing at least one chlorine atom in the presence of ferric chloride.

2. A process as set forth in claim 1, wherein the organic compound is an aromatic compound.

3. A process as set forth in claim 1, wherein said organic compound is an alkane.

4. A process as set forth in claim 1, wherein said organic compound is a haloalkane.

5. A process as set forth in claim 1, wherein the organic compound and the saturated halohydrocarbon are the same.

6. A process for preparing bromine-containing saturated aliphatic halohydrocarbons which comprises contacting a saturated aliphatic halohydrocarbon containing at least one chlorine atom with hydrogen bromide and ferric chloride.

7. A process as set forth in claim 6 wherein the contacting is done at a temperature of from 25° to 120° C.

References Cited in the file of this patent

UNITED STATES PATENTS

| | | |
|---|---|---|
| 1,964,720 | Coffman | July 3, 1934 |
| 2,452,154 | Ross | Oct. 26, 1948 |
| 2,553,518 | Lake et al. | May 15, 1951 |
| 2,729,687 | Sterling | Jan. 3 1956 |

OTHER REFERENCES

Scheufelan: Liebig's Annalen der Chemie, 231, 152–195 (1885), pp. 152–155 and 186–188 especially relied on.